United States Patent [19]

Takagi

[11] Patent Number: 5,260,998
[45] Date of Patent: Nov. 9, 1993

[54] FOLDING PORTABLE TELEPHONE SET

[75] Inventor: Hisamitsu Takagi, Inagi, Japan

[73] Assignee: Fujitsu Limited, Kawasaki, Japan

[21] Appl. No.: 756,908

[22] Filed: Sep. 9, 1991

[30] Foreign Application Priority Data

Sep. 7, 1990 [JP] Japan .................................. 2-235663

[51] Int. Cl.⁵ .............................................. H04M 1/00
[52] U.S. Cl. .................................... 379/433; 379/434
[58] Field of Search ............... 379/430, 446, 447, 449,
379/426, 58, 433; 455/89, 90, 128

[56] References Cited

FOREIGN PATENT DOCUMENTS

| | | |
|---|---|---|
| 60-21636 | 2/1985 | Japan . |
| 18824 | 1/1988 | Japan .................................. 379/58 |
| 63-129755 | 6/1988 | Japan . |
| 63-288549 | 11/1988 | Japan . |
| 175826 | 7/1991 | Japan .................................. 379/58 |
| 661369 | 7/1987 | Switzerland ...................... 379/436 |

Primary Examiner—James L. Dwyer
Assistant Examiner—Jack Chiang
Attorney, Agent, or Firm—Staas & Halsey

[57] ABSTRACT

A folding portable telephone set includes a plurality of sequentially articulated flat plate segments. A second flat segment is connected at one edge to an edge of a first flat segment provided with a transmitter and a switching unit by a hinge joint, a third flat segment provided with a receiver is connected at one edge to another edge of the second flat segment by a hinge joint, and a fourth flat segment provided with a display unit is connected at one edge to another edge of the third flat segment by a hinge joint. The total length of the third and fourth flat segments as extended flat in a plane is less than the length of the second flat segment.

10 Claims, 12 Drawing Sheets

FOLDING PORTABLE TELEPHONE SET

FIELD OF THE INVENTION

The present invention relates to a folding portable telephone set and, more particularly, to a folding portable telephone set formed in a thin construction by employing a plurality of jointed flat segments.

BACKGROUND OF THE INVENTION

An important object of communication is to enable anyone to communicate or exchange intentions or information when necessary at any place at any time. Accordingly, mobile communication service, in addition to conventional fixed communication service for communication between fixed points, has been developed. Mobile communication service enables communication between mobile objects, such as ships, automobiles and aircraft, and between mobile objects and general subscribers or offices. Recently, portable telephone sets and cordless telephone sets for mobile communication have actively been developed.

Generally, in using a telephone set, the telephone receiver is held to the ear and the telephone transmitter is held near the mouth. Accordingly, a sufficiently large distance must be secured between the telephone receiver and the telephone transmitter of a telephone set, even if it is a portable telephone set. Therefore, conventional telephone sets are long and large.

A folding portable telephone set provided with a folding cover for protecting the switching unit has been proposed. In this previously proposed portable telephone set, the transmitter is provided on the folding cover, and the receiver is provided on the casing so that a sufficient distance is secured between the transmitter and the receiver.

As mentioned above, the telephone receiver and the telephone transmitter of the conventional portable telephone set are spaced a distance substantially equal to the distance between the ear and the mouth. Therefore it has been difficult to construct the portable telephone set in a satisfactorily small size. Techniques of manufacturing the component parts of portable telephone sets have made remarkable progress in recent years and small, inexpensive component parts are available. From the view point of component parts, it is comparatively easy to miniaturize portable telephone sets. However, an ergonomic requirement that a distance corresponding to that between the ear and the mouth of a man must be secured between the telephone receiver and the telephone transmitter is a principal problem in miniaturizing a telephone set.

SUMMARY OF THE INVENTION

Accordingly, it is an object of the present invention to provide a flat, small, folding portable telephone set meeting ergonomic requirements.

Another object of the present invention is to provide a folding portable telephone set comprising a plurality of hinged flat segments.

In accordance with one aspect of the present invention, there is provided a folding portable telephone set comprising a first flat segment provided with a microphone and switching means, and having the shape of a flat plate; a second flat segment provided with a transmission-reception circuit, jointed at one edge to the first flat segment, and having the shape of a flat plate; a third flat segment internally provided with an earphone, jointed at one edge to another edge of the second flat segment, and having the shape of a flat plate; and a fourth flat segment provided with a display, jointed at one edge to another edge of the third flat segment, and having the shape of a flat plate. The total length of the third and fourth flat segments as extended flat in a plane is less than the length of the second flat segment.

In using the folding portable telephone set, the third flat segment is set at an acute angle to the second flat segment and the free edge of the fourth flat segment is set at a predetermined position on the second flat segment so that an obtuse angle is formed between the third and fourth flat segments. When the folding portable telephone set is thus unfolded, the telephone transmitter on the first flat segment is located near the mouth with the telephone receiver on the third flat segment set to the ear.

In folding up the folding portable telephone set, the third and fourth flat segments are extended flat on the second flat segment, and then the second flat segment is laid flat on the first flat segment. Thus the folding portable telephone set can compactly be folded up.

In accordance with another aspect of the present invention, there is provided a folding portable telephone set comprising a first flat segment provided with a microphone, switching means and a transmission-reception circuit, and having the shape of a flat plate; a second flat segment provided with a display, jointed at one edge to one edge of the first flat segment, and having the shape of a flat plate; and a third flat segment internally provided with an earphone, jointed at one edge to another edge of the second flat segment, and having the shape of a flat plate; wherein the total length of the second and third flat segments on a plane is substantially equal to the length of the first flat segment.

In using the folding portable telephone set, the second flat segment is set so that the front surface thereof extends at an obtuse angle to the front surface of the first flat segment, and the third flat segment is set so that the back surface thereof extends at a predetermined obtuse angle to the back surface of the second flat segment. When the folding portable telephone set is thus unfolded, the telephone transmitter on the first flat segment is located near the mouth with the telephone receiver on the third flat segment set to the ear.

In folding up the folding portable telephone set to facilitate carrying the same, the second and third flat segments are laid flat on the first flat segment. Thus the folding portable telephone set can compactly be folded up to facilitate carrying the same.

The above and other objects, features and advantages of the present invention and the manner of realizing them will become more apparent, and the invention itself will best be understood from a study of the following description an appended claims with reference to the attached drawings showing preferred embodiments of the invention.

DESCRIPTION OF THE PREFERRED EMBODIMENTS

Figure 1:
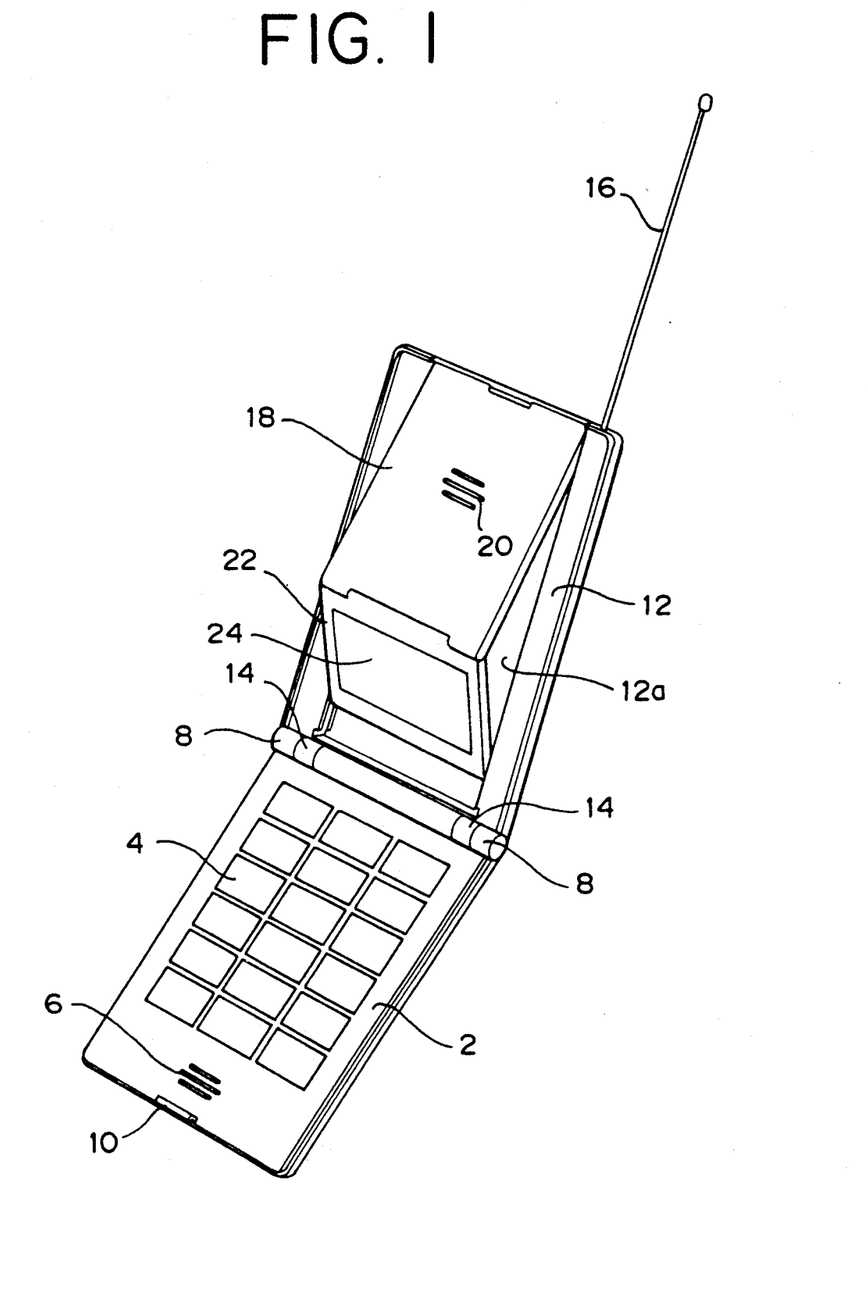
FIG. 1 is a perspective view of a folding portable telephone set of a first embodiment according to the present invention.

A folding portable telephone set of a first embodiment according to the present invention will be described hereinafter with reference to FIGS. 1 to 14. Referring mainly to FIGS. 1 and 4, a first flat segment 2 is provided with a switching unit 4 having a dialing function, a built-in microphone 38 disposed under a perforated portion 6, and a built-in telephone logic unit 28. The first flat segment 2 is provided on its one edge with a pair of knuckles 8 and with a catch 10 near the opposite edge.

A second flat segment 12 is provided internally with a transmission-reception circuit. The second flat segment 12 is provided on its one edge with a pair of knuckles 14. In jointing the first flat segment 2 and the second flat segment 12, the knuckles 14 of the second flat segment 12 are placed in alignment with the knuckles 8 of the first flat segment 2, and the first flat segment 2 and the second flat segment 12 are jointed by a hinge joint mechanism, which will be described later, so that the second flat segment 12 is able to turn on the hinge joint mechanism relative to the first flat segment 2. The second flat segment 12 is provided in its front surface with a shallow recess 12a having a width substantially equal to that of a third flat segment 18 and a fourth flat segment 22. A telescopic antenna is stored in the second flat segment 12.

The third flat segment 18 is jointed to the second flat segment 12, and is provided internally with an earphone 46 under a perforated portion 20. The fourth flat segment 22 is provided with a display unit 24 and is jointed to the third flat segment 18. The fourth flat segment 22 can be held at a predetermined angle to the second flat segment 12 by a holding mechanism, which will be described later.

Figure 2:
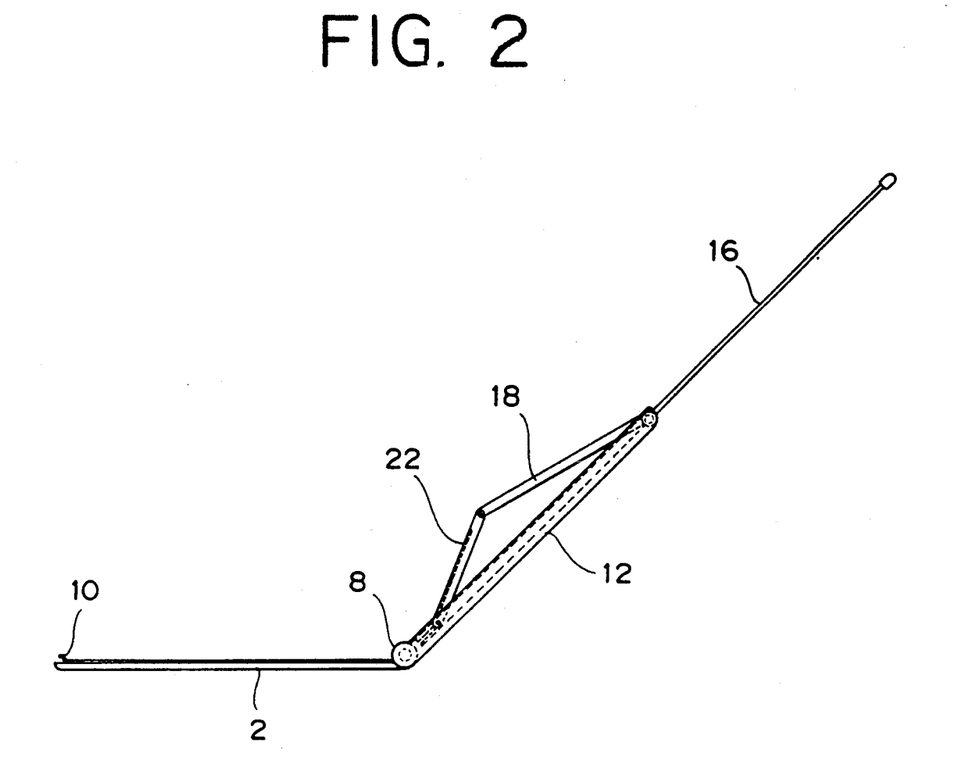
FIG. 2 is a side view of the folding portable telephone set of FIG. 1.

The folding portable telephone set is unfolded for use in the state shown in FIGS. 1 and 2. The folding portable telephone set is folded up for carrying in the state shown in FIG. 3 by retracting the telescopic antenna 16 into the second flat segment 2, placing the third flat segment 18 and the fourth flat segment 22 in the recess 12a of the second flat segment 12, and then turning the second flat segment 12 to place the same on the first flat segment 2.

Referring to FIG. 4 showing a flexible printed wiring board 26 employed in the folding portable telephone set in the first embodiment, the flexible printed wiring board 26 is provided with the telephone logic unit 28, a transmission-reception unit 30, a receiving unit 32, and a LCD unit 34. A membrane switch 36 is connected to the logic circuit 28 by a connector 37. The microphone 38 is mounted on the telephone logic unit 28. A pair of power feed terminals 40 are attached to the backside of the logic unit 28. When a battery pack 42 is mounted on the first flat segment 2, a pair of terminals 44 of the battery pack 42 are connected to the power feed terminals 40. The antenna 16 is connected to the transmission-reception unit 30; the receiving unit 32 is provided with the earphone 46; the LCD unit 34 is provided with a LCD 48.

Figures 5, 6:
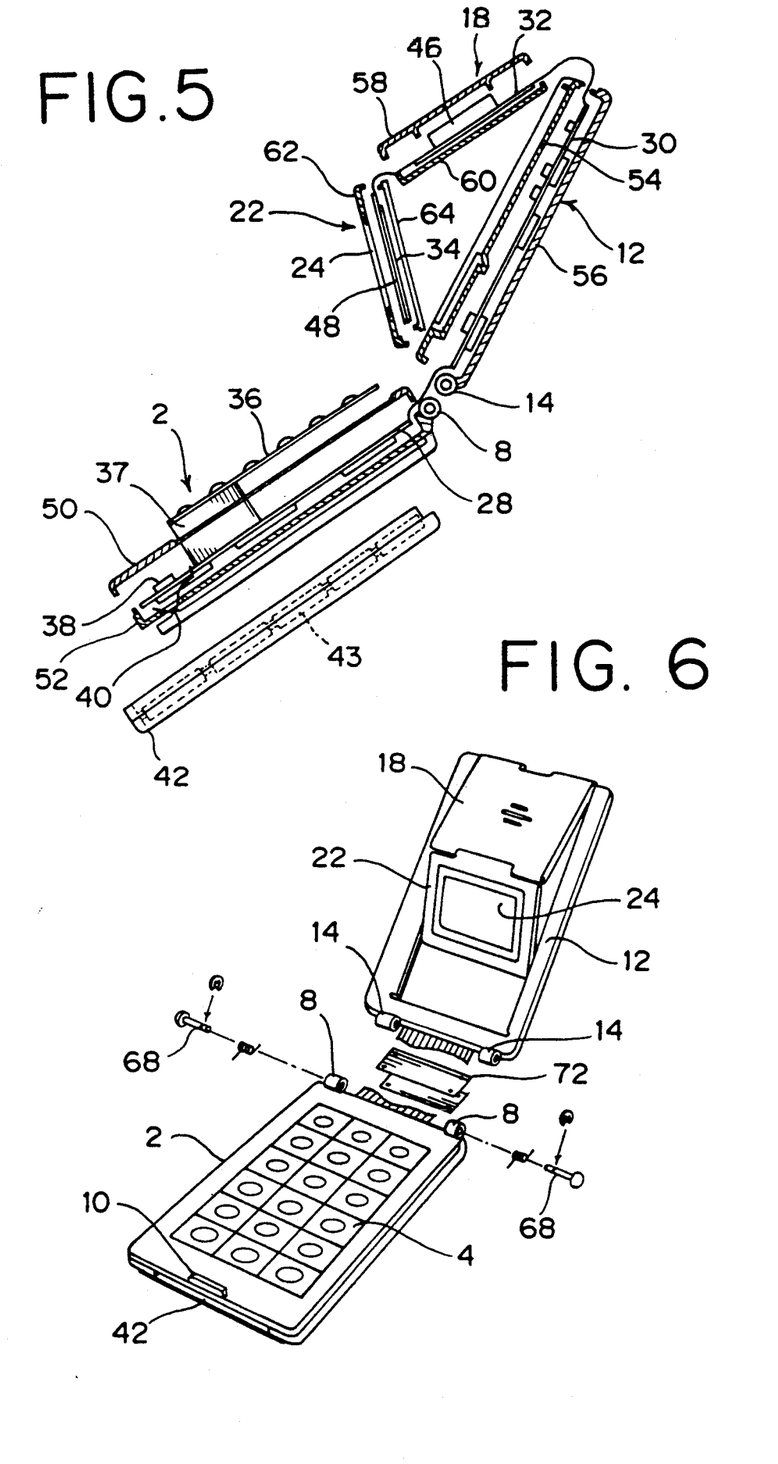
FIG. 5 is an exploded sectional view of the folding portable telephone set of the first embodiment.
FIG. 6 is an exploded perspective view of the folding portable telephone set of the first embodiment.

The construction of the folding portable telephone set in the first embodiment will further be described with reference to FIG. 5. The first flat segment 2 comprises the logic unit 28 of the flexible printed wiring board 26, and a casing consisting of a front casing 50 and a rear casing 52 and containing the logic unit 28. The battery pack 42 containing a plurality of batteries 43 is joined detachably to the rear casing 52. The second flat segment 12 comprises the transmission-reception unit 30 of the flexible printed wiring board 26, and a casing consisting of a front casing 54 and a rear casing 56 and containing the transmission-reception unit 30. The third flat segment 18 comprises the receiving unit 32 of the flexible printed wiring board 26, provided with the earphone 46, and a casing consisting of a front casing 58 and a rear casing 60 and containing the receiving unit 32. The fourth flat segment 22 comprises the LCD unit 34 of the flexible printed wiring board 26, provided with the LCD 48, and a casing consisting of a front casing 62 and a rear casing 64 and containing the LCD unit 34. A transparent window 24 is formed in the front casing 62 of the fourth flat segment 22.

A hinge joint mechanism jointing the first flat segment 2 and the second flat segment 12 will be described with reference to FIGS. 6 to 8.

Figure 7:
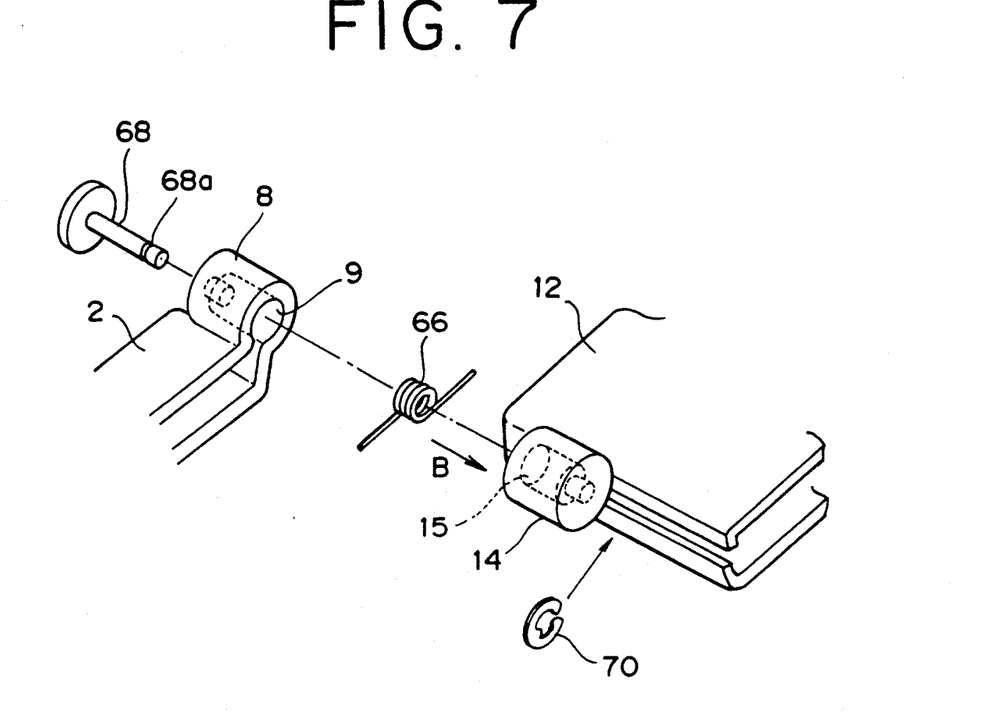
FIG. 7 is an enlarged exploded perspective view of a hinge joint for jointing a first flat segment and a second flat segment.
Figure 8:
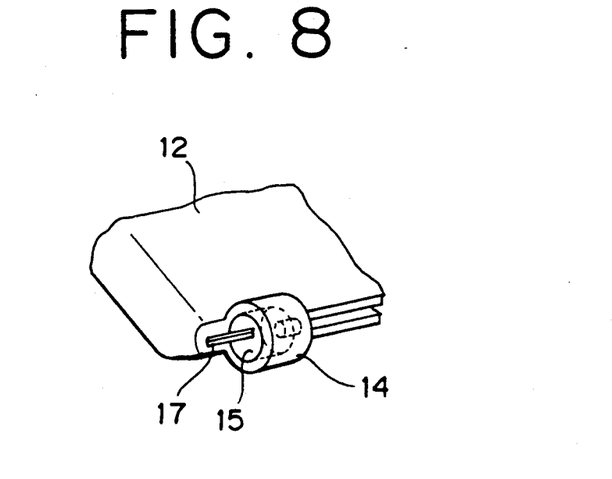
FIG. 8 is a view taken in the direction of the arrow B in FIG. 7.

As best shown in FIG. 7, the knuckles 8 of the first flat segment 2 are provided with through holes 9, and the knuckles 14 of the second flat segment 12 are provided with through holes 15. As shown in FIG. 8, a slit 17 for receiving one end of a torsion spring 66 is formed near each of the knuckles 14 of the second flat segment 12. The torsion spring 66 is interposed between each knuckle 8 and the corresponding knuckle 14, hinge pins 68 are inserted through the through holes 9 of the knuckles 8 into the corresponding through holes 15 of the knuckles 14, and then snap rings 70 are put in the respective annular grooves 68a of the hinge pins 68 to joint the second flat segment 12 to the first flat segment 2. The gap between the first flat segment 2 and the second flat segment 12 is covered with a pair of corrugated strips 72 to protect the flexible printed wiring board 26 contained in the first flat segment 2 and the second flat segment 12.

Figure 9:
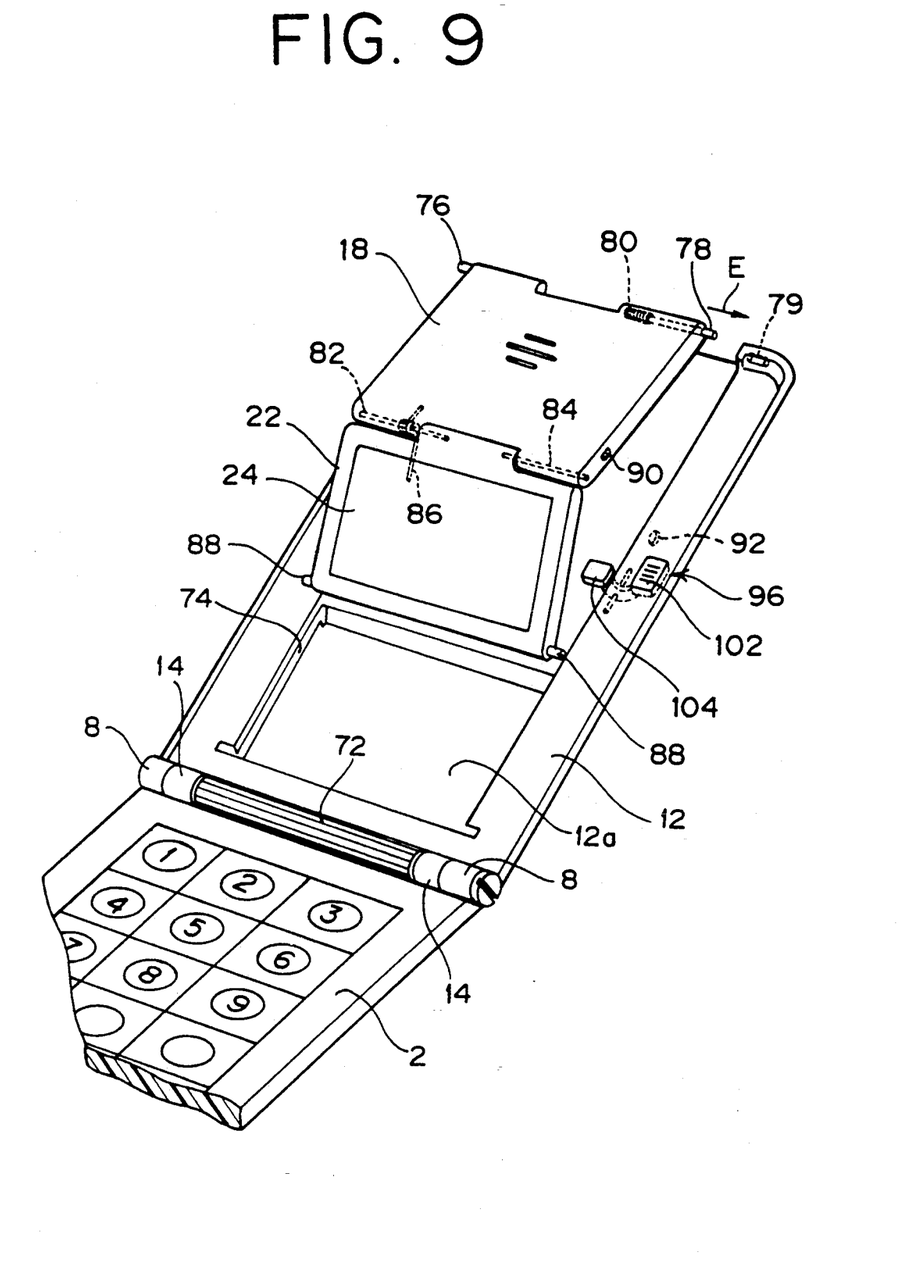
FIG. 9 is an enlarged perspective view of the folding portable telephone set of the first embodiment, showing the construction of a hinge joint between the second flat segment and a third flat segment, and that of a hinge joint between the third flat segment and a fourth flat segment.
Figure 10:
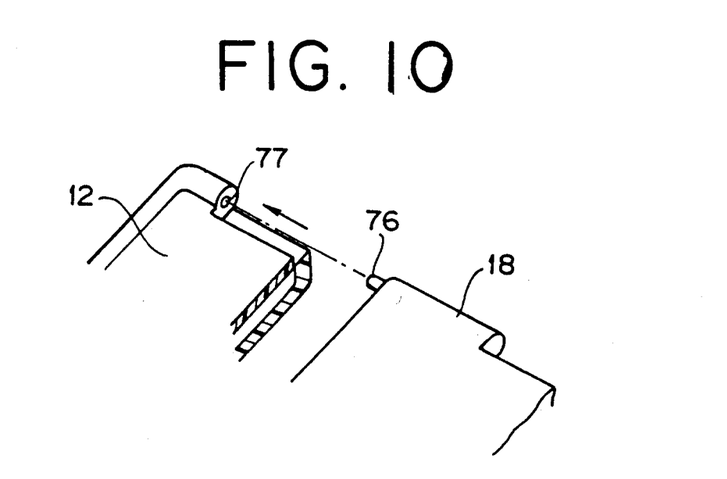
FIG. 10 is a fragmentary partly cutaway perspective view of the hinge joint between the second flat segment and the third flat segment.
Figure 11:
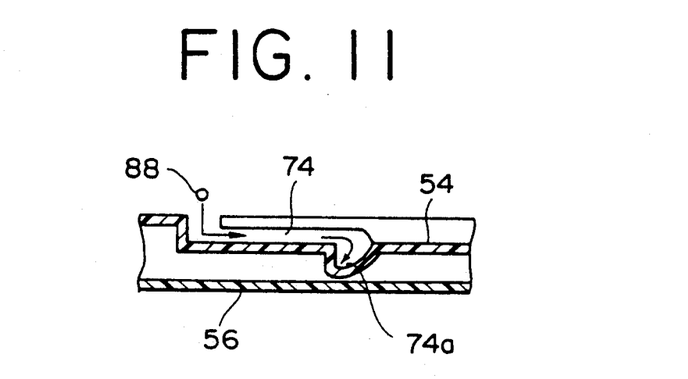
FIG. 11 is a fragmentary sectional view of a setting structure for setting the fourth flat segment at a predetermined angle to the second flat segment.

Referring to FIGS. 9 and 10, A pin 76 fixed to one end of one edge of the third flat segment 18 is inserted in a hole 77 formed in one end of the other edge of the second flat segment 12 (FIG. 10). A pin 78 inserted in a hole formed in the other end of the same edge of the third flat segment 18 and biased outward, namely, in the direction of the arrow E, by a spring 80 is received in a hole 79 formed in the other end of the same edge of the second flat segment 12. In jointing the third flat segment 18 to the second flat segment 12 so that the third flat segment 18 is able to turn relative to the second flat segment 12, the pin 76 is inserted in the hole 77 of the second flat segment 12, and then the pin 78 is inserted in the hole 79 of the second flat segment 12.

Figure 12:
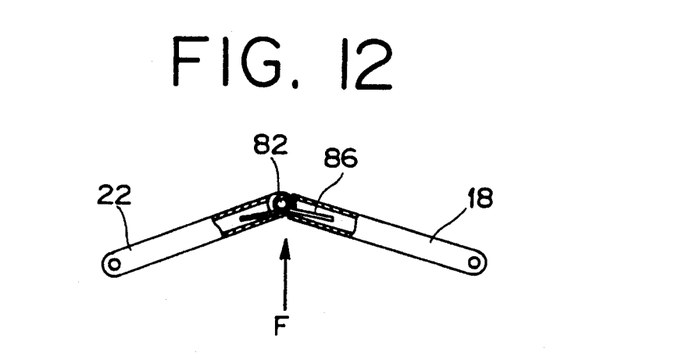
FIG. 12 is a fragmentary partly sectional side view of a hinge joint between the third flat segment and the fourth flat segment.

The fourth flat segment 22 is jointed to the third flat segment 18 with a pair of pins 82 and 84 so that the fourth flat segment 22 is able to turn relative to the third flat segment 18. A torsion spring 86 is wound on the pin 82 to bias the joint of the third flat segment 18 and the fourth flat segment 22 in the direction of the arrow F as shown in FIG. 12.

A pair of pins 88 are fixed to the opposite ends of the free edge of the fourth flat segment 22. Grooves 74 are formed respectively in the side surfaces of the recess 12a of the second flat segment 12. The pins 88 are inserted in and may be moved along the grooves 74 in the direction of the arrow shown in FIG. 11 until the pins 88 drop into recesses 74a formed at the depths of the grooves 74, respectively, to set the fourth flat segment 22 at a predetermined angle to the second flat segment 12.

Figure 13:
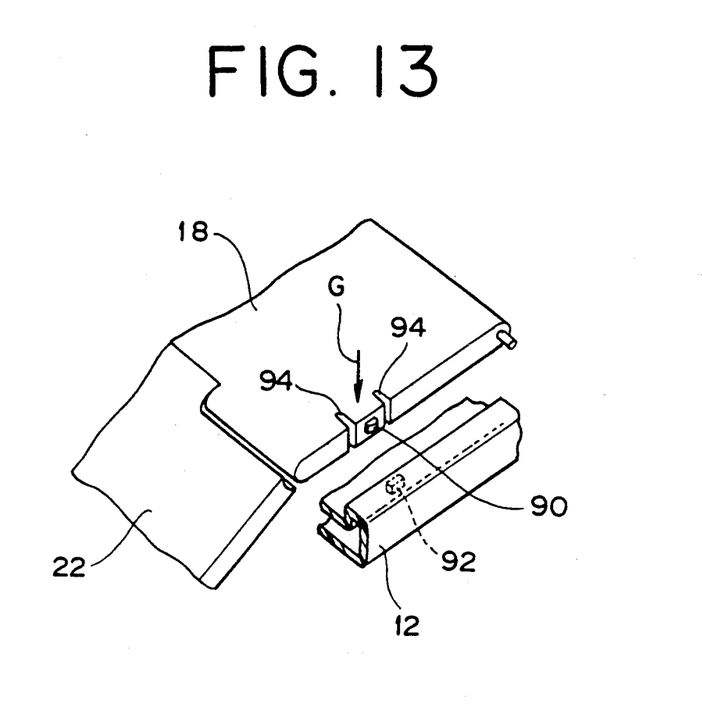
FIG. 13 is a fragmentary partly cutaway perspective view of a locking mechanism for locking the third flat segment to the second flat segment.

A projection 90 is formed on one side surface of the third flat segment 18. The projection 90 is fitted in a recess 92 formed in one side surface of the recess 12a of the second flat segment 12 to lock the third flat segment 18 to the second flat segment 12. As shown in FIG. 13, slits 94 are formed in the side surface of the third flat segment 18 on the opposite sides of the projection 90 to enable the projection 90 to be distorted elastically. When the third flat segment 18 is depressed in the direction of the arrow G (FIG. 13), the projection 90 is fitted in the recess 92 to lock the third flat segment 18 to the second flat segment 12.

Figure 14:
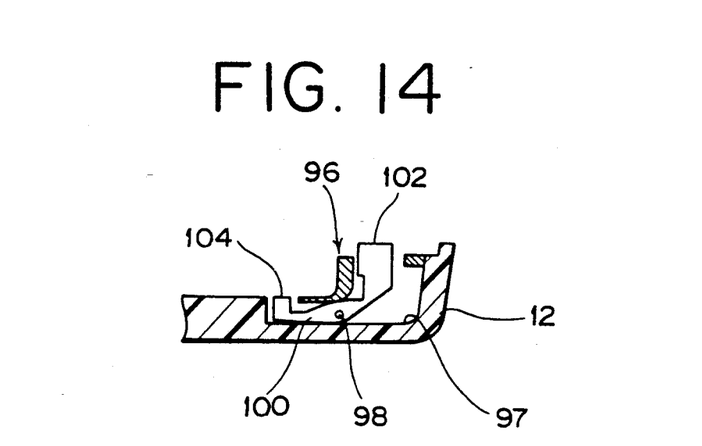
FIG. 14 is a fragmentary sectional view of an unlocking mechanism.

In FIGS. 9 and 14, indicated at 96 is an unlocking mechanism. As best shown in FIG. 14, a lever 100 is supported pivotally on a pin 98 in a cavity 97 formed in the second flat segment 12. When one end 102 of the lever 100 is depressed, the other end 104 of the same rises to release the third flat segment 18 from the second flat segment 12.

In using the folding portable telephone set, the flat segments are set respectively in positions as shown in FIGS. 1 and 2; that is, the second flat segment 12 is extended so that an obtuse angle is formed between the first flat segment 2 and the second flat segment 12, the third flat segment 18 is extended toward the first flat segment 2 so that an acute angle is formed between the second flat segment 12 and the third flat segment 18, and then the pins 88 fixed to the opposite ends of the free edge of the fourth flat segment 22 are fitted in the recesses 74a formed at the extremities of the grooves 74 to secure the third flat segment 18 and the fourth flat segment 22 with a predetermined obtuse angle therebetween. After thus unfolding the folding portable telephone set, the earphone provided on the third flat segment 18 is set to the ear. In this state, the microphone is located near the mouth for transmission.

Figure 3:
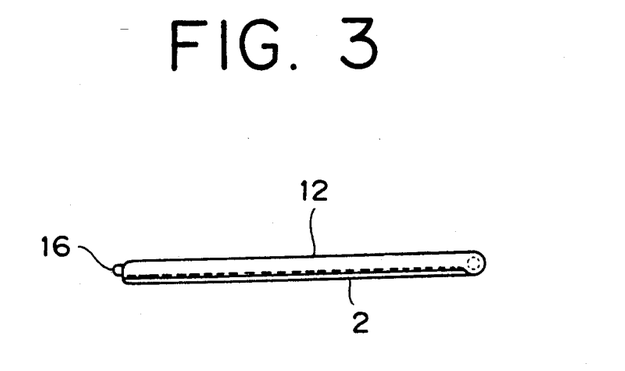
FIG. 3 is a side view of the folding portable telephone set showing the first embodiment in a folded state.
Figure 4:
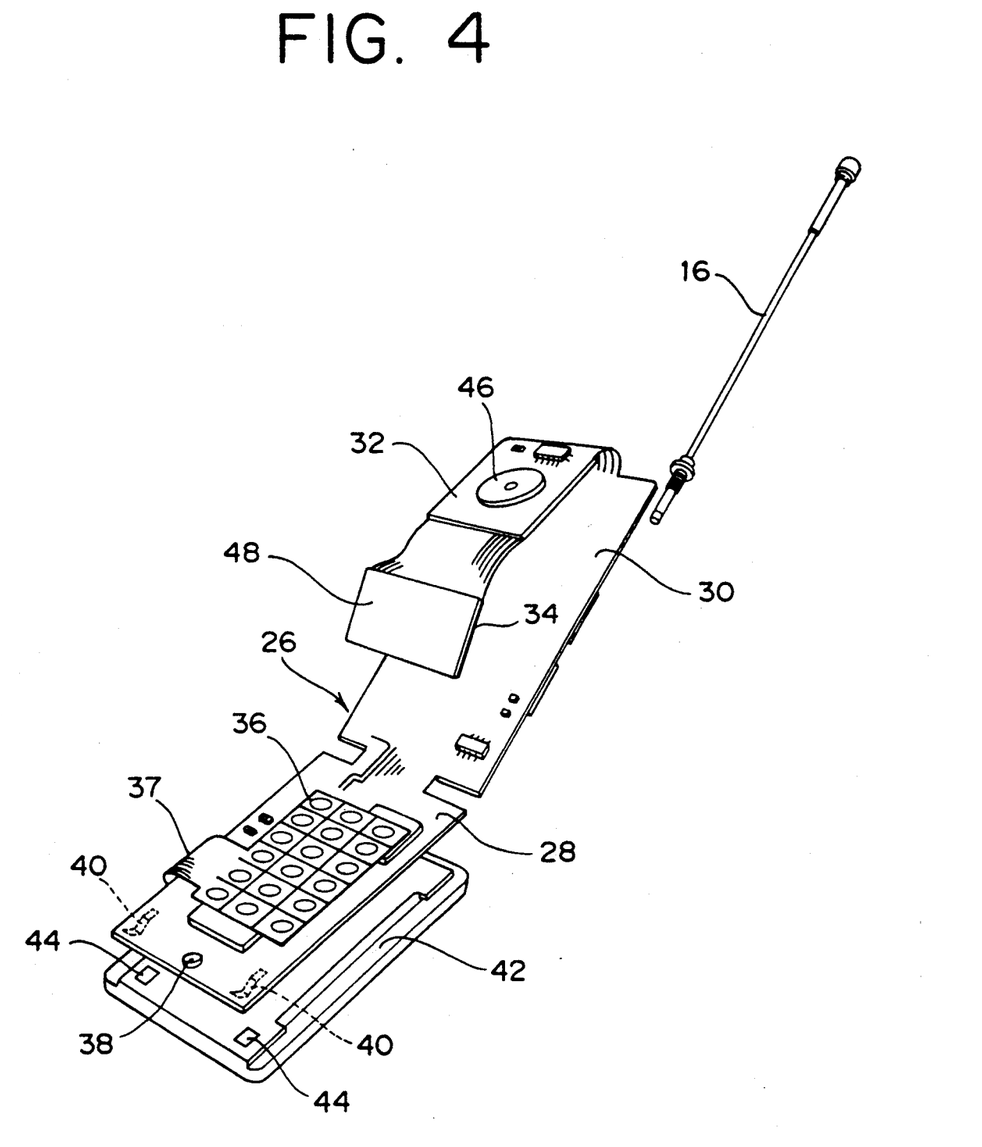
FIG. 4 is a perspective view of a flexible printed wiring board employed in the folding portable telephone set of the first embodiment.

In folding up the folding portable telephone set, the pins 88 are removed from the recesses 74a of the second flat segment 12, the third flat segment 18 and the fourth flat segment 22 are placed flat in the recess 12a of the second flat segment 12, and then the second flat segment 12 is turned down on the first flat segment 2 as shown in FIG. 3.

A folding portable telephone set in a second embodiment according to the present invention will be described hereinafter with reference to FIGS. 15 to 22.

Figure 15:
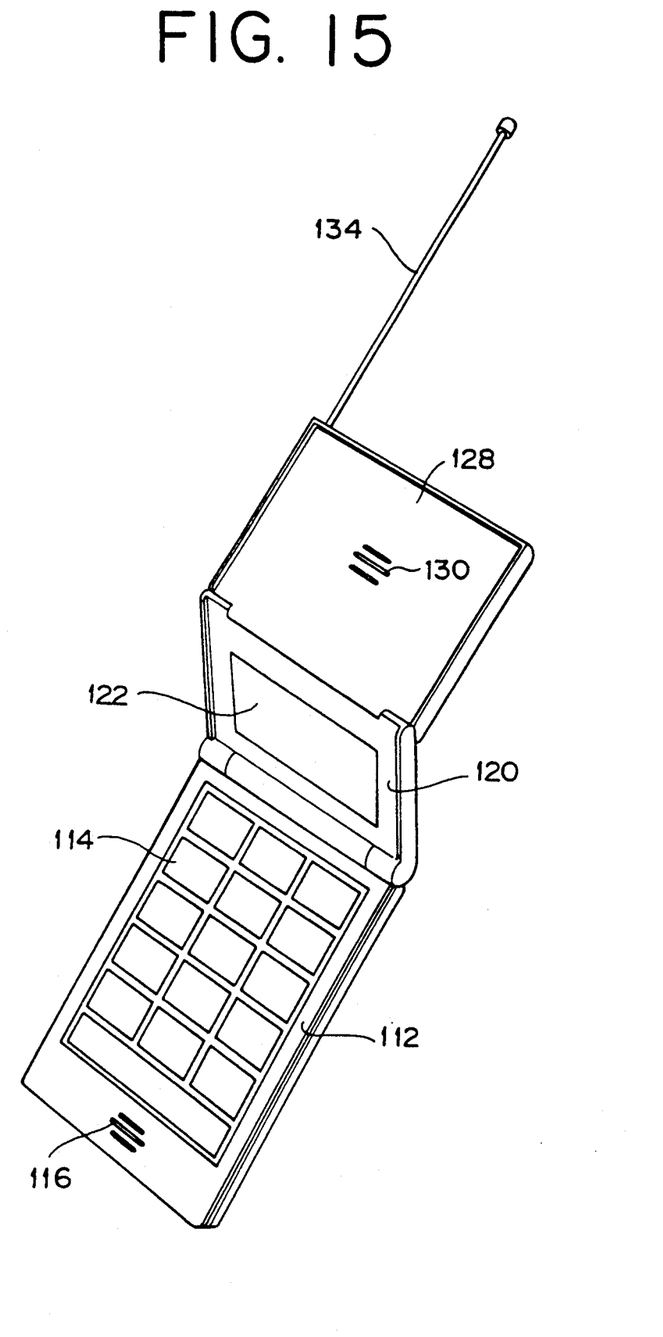
FIG. 15 is a perspective view of a folding portable telephone set of a second embodiment according to the present invention.
Figure 16:
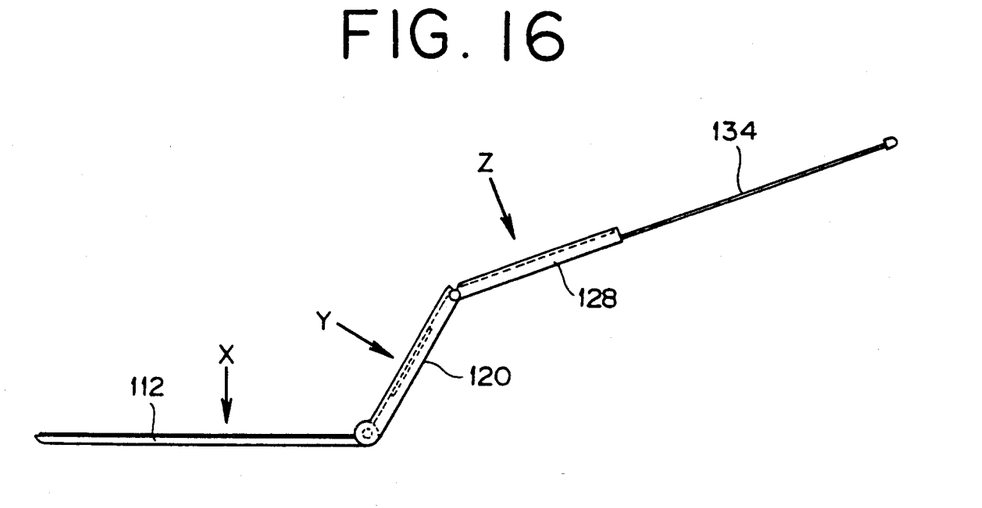
FIG. 16 is a side view of the folding portable telephone set of the second embodiment.
Figure 17:
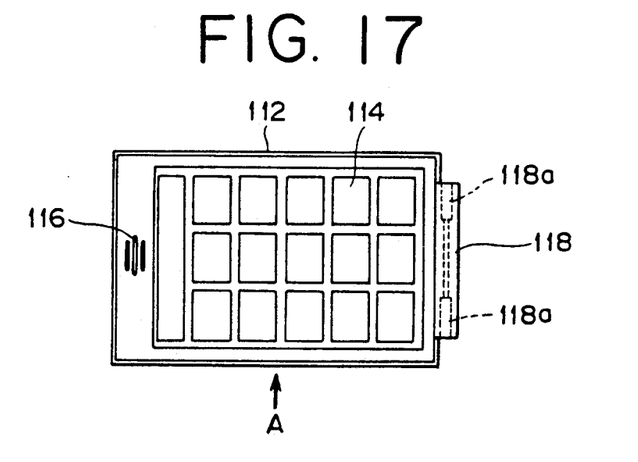
FIG. 17 is a view taken along the direction of the arrow X in FIG. 16.
Figure 18:
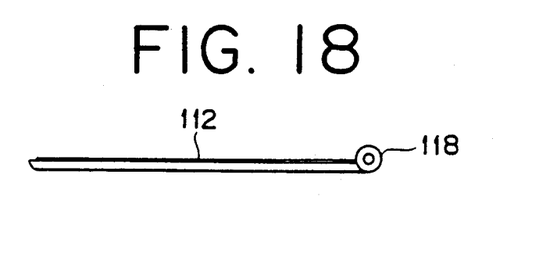
FIG. 18 is a view taken along the direction of the arrow A in FIG. 17.
Figure 19:
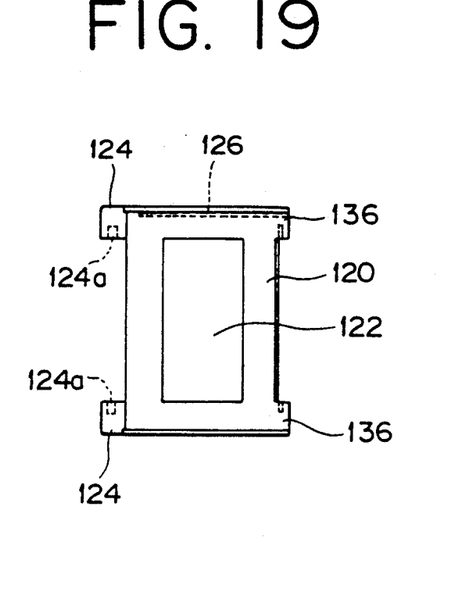
FIG. 19 is a view taken along the direction of the arrow Y in FIG. 16.
Figure 20:
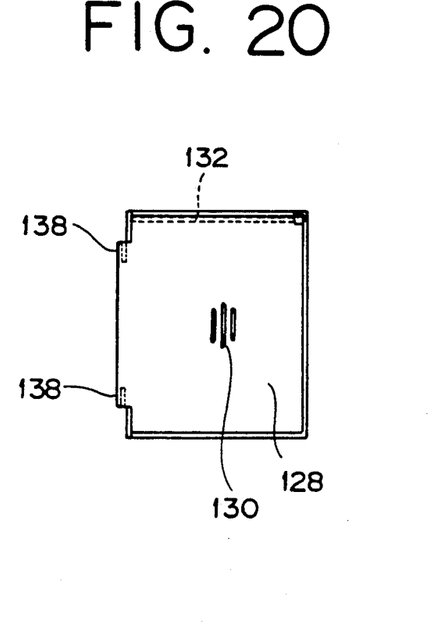
FIG. 20 is a view taken along the direction of the arrow Z in FIG. 16.
Figure 21:
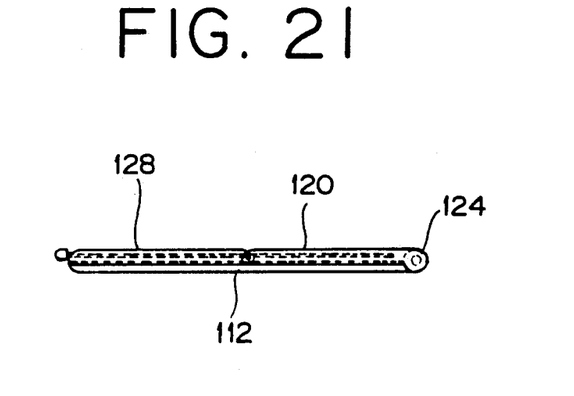
FIG. 21 is a side view of the folding portable telephone set of the second embodiment in a folded state.

The folding portable telephone set comprises a first flat segment 112, a second flat segment 120 and a third flat segment 128. The first flat segment 112 is provided internally with a transmission-reception circuit, not shown, and a switching unit 114 having a dialing function. A battery pack, not shown, is combined detachably with the first flat segment 112. The first flat segment 112 has a perforated portion 116 near one edge thereof, and is provided on the other edge thereof with a knuckle 118 provided with a pair of holes 118a in the opposite ends thereof. A microphone is disposed under the perforated portion 116.

The second flat segment 120 is provided with a display unit 122 having a built-in LCD. A pair of knuckles 124 respectively having holes 124a are formed on one edge of the second flat segment 120 adjacent to the first flat segment 112. Hinge pins are inserted in the holes 118a of the knuckle 118 of the first flat segment 112 and the holes 124a of the knuckles 124 of the second flat segment 120 to joint the second flat segment 120 to the first flat segment 112 so that the second flat segment 120 can be turned down on the first flat segment 112. A grove 126 for storing an antenna 134 is formed in one side portion of the second flat segment 120. A pair of knuckles 136 provided with holes are formed on the other edge of the second flat segment 120.

Figure 22:
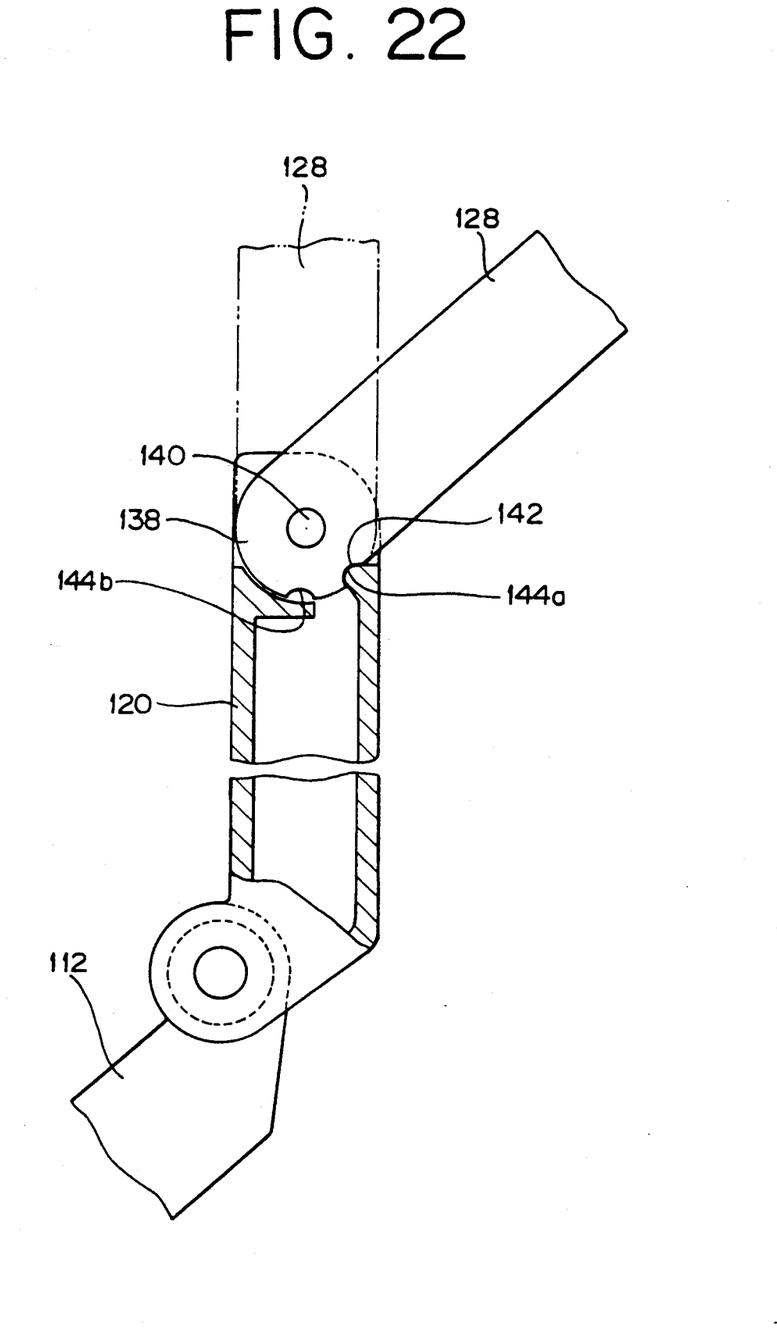
FIG. 22 is a fragmentary partly sectional side view of a holding mechanism for holding a third flat segment at a predetermined angle to a second flat segment of the folding portable telephone set of the second embodiment.

A knuckle 138 provided with holes in the opposite ends thereof is formed on one edge of the third flat segment 138 adjacent to the second flat segment 120. As shown in FIG. 22, pins 140 are inserted in the holes of the knuckles 136 of the second flat segment 120 and the knuckle 138 of the third flat segment 128 to joint the third flat segment 128 pivotally to the second flat segment 120. The third flat segment 128 has a perforated portion 130, and is provided with an earphone under the perforated portion 130. A groove 132 for storing the antenna 134 is formed in one side portion of the third flat segment 128.

Referring to FIG. 22 showing a holding mechanism for holding the third flat segment 128 on the second flat segment 120 at a predetermined angle to the second flat segment 120, the knuckles 136 of the second flat segment 120 are provided integrally with protrusions 142, and the knuckle 138 of the third flat segment 128 is provided with recesses 144a at positions corresponding to the protrusions 142. In extending the third flat segment 128 at the predetermined angle to the second flat segment 120, the third flat segment 128 is turned relative to the second flat segment 120 until the protrusions 142 drop into the recesses 144a. Thus, the third flat segment 128 is held on the second flat segment 120 in a position shown in FIG. 22 by the engagement of the protrusions 142 and the recesses 144a.

By engaging the protrusions 142 of the second flat segment 120 with other recesses 144b formed in the third flat segment 128, the second and third flat segments 120 and 128 are held flat as indicated by phantom lines in FIG. 22.

In using the folding portable telephone set, the second flat segment 120 is extended in one direction so as to form an obtuse angle between the first flat segment 112 and the second flat segment 120, and then the third flat segment 128 is extended in the opposite direction so as to form an obtuse angle between the second flat segment 120 and the third flat segment 128. As shown in FIG. 22, the third flat segment 128 is held so that the predetermined obtuse angle is formed between the second flat segment 120 and the third flat segment 128. When the earphone provided on the third flat segment 128 is set to the ear, the microphone provided on the first flat segment 112 is located near the mouth for transmission.

In folding up the folding portable telephone set, the second flat segment 120 and the third flat segment 128 are turned down flat on the first flat segment 112. Since the total length of the second flat segment 120 and the third flat segment 128 is approximately equal to the length of the first flat segment 112, the folding portable telephone set can compactly be folded up.

What is claimed is:

1. A folding portable telephone set comprising:
   a first flat plate segment provided with a microphone and switching means;
   a second flat plate segment internally provided with a transmission-reception circuit, pivotally connected at a first edge to an edge of the first flat plate segment;
   a third flat plate segment internally provided with an earphone, pivotally connected at a first edge to a second edge of the second flat plate segment; and
   a fourth flat plate segment provided with a display unit, pivotally connected at a first edge to a second edge of the third flat plate segment;
   wherein a combined total length of the third and fourth flat plate segments as extended flat in a plane is less than a total length of the second flat plate segment.

2. A folding portable telephone set according to claim 1, wherein a battery pack is detachably attached to said first flat plate segment, and a telescopic antenna is attached to said second flat plate segment.

3. A folding portable telephone set according to claim 1, wherein a second edge of said fourth flat plate segment is provided wiht a pair of pins projecting respectively from opposite sides thereof, the pins being fitted respectively in recesses formed in the second flat segment to lock the third and fourth flat segments on the second flat segment at a predetermined obtuse angle formed between the third and fourth flat segments.

4. A folding portable telephone set comprising:
   a first flat plate segment internally provided with a microphone, switching means and a transmission-reception circuit;
   a second flat plate segment provided with a display unit, pivotally connected at a first edge to an edge of the first flat plate segment; and
   a third flat plate segment internally provided with an earphone, pivotally connected at one edge to a second edge of the second flat plate segment;
   wherein a combined total length of the second and third flat plate segments as extended flat in a plane is approximately equal to a total length of the first flat plate segment.

5. A folding portable telephone set according to claim 4, wherein a battery pack is detachably attached to said first flat plate segment, and a telescopic antenna is attached to said third flat plate segment.

6. A folding portable telephone set according to claim 4, wherein said third flat segment is held at a predetermined angle to said second flat segment by holding means.

7. A folding portable telephone set according to claim 1, wherein said third and fourth flat plate segments are adapted to be folded flat upon said second flat plate segment.

8. A folding portable telephone set according to claim 7, which further includes locking means for locking at least one of said third and fourth flat plate segments to said second flat plate segment when said third and fourth flat plate segments are folded flat upon said second flat plate segment.

9. A folding portable telephone set according to claim 7, wherein said second flat plate segment is provided with a recess for receiving said third and fourth flat plate segments when said third and fourth flat plate segments are folded flat upon said second flat plate segment.

10. A folding portable telephone set according to claim 7, wherein spring means are provided between said third flat plate segment and said fourth flat plate segment to bias said third and fourth flat plate segments in a direction away from said second flat plate segment.

* * * * *

UNITED STATES PATENT AND TRADEMARK OFFICE
CERTIFICATE OF CORRECTION

PATENT NO. : 5,260,998
DATED : November 9, 1993
INVENTOR(S) : Hisamitsu TAKAGI

It is certified that error appears in the above-indentified patent and that said Letters Patent is hereby corrected as shown below:

On the title page, item [56] References Cited, change "661369"

to --661396--.

Column 1, line 12, delete "intentions or".

Column 2, line 55, change "an" to --and--.

Signed and Sealed this

Seventeenth Day of May, 1994

Attest:

BRUCE LEHMAN

Attesting Officer          Commissioner of Patents and Trademarks